(12) United States Patent
Smith, III

(10) Patent No.: US 6,202,690 B1
(45) Date of Patent: Mar. 20, 2001

(54) PRESSURE BALANCED UNDERSEA HYDRAULIC COUPLING

(75) Inventor: Robert E. Smith, III, Missouri City, TX (US)

(73) Assignee: National Coupling Company, Inc., Stafford, TX (US)

(*) Notice: Subject to any disclaimer, the term of this patent is extended or adjusted under 35 U.S.C. 154(b) by 0 days.

(21) Appl. No.: 09/565,168

(22) Filed: May 3, 2000

(51) Int. Cl.$^7$ .................................................... F16L 37/28
(52) U.S. Cl. .................... 137/614.04; 137/614; 285/108; 285/110
(58) Field of Search ............................... 137/614, 614.04, 137/614.01, 614.02, 614.03; 285/108, 111, 110

(56) References Cited

U.S. PATENT DOCUMENTS

| | | |
|---|---|---|
| Re. 25,920 | 11/1965 | Moen . |
| 2,071,204 | 2/1937 | Hunt . |
| 2,457,251 | 12/1948 | Main . |
| 2,471,237 | 5/1949 | Pasturczak . |
| 2,599,935 | 6/1952 | Pasker . |
| 2,727,759 | 12/1955 | Elliott . |
| 2,727,761 | 12/1955 | Elliott et al. . |
| 2,772,898 | 12/1956 | Seeler . |
| 3,056,423 | 10/1962 | Lieser . |
| 3,215,161 | 11/1965 | Goodwin et al. . |
| 3,422,864 | 1/1969 | Allinquant . |
| 3,613,726 | 10/1971 | Torres . |
| 3,730,221 | 5/1973 | Vik . |
| 4,124,228 | 11/1978 | Morrison . |
| 4,222,411 | 9/1980 | Herzan et al. . |
| 4,582,347 | 4/1986 | Wilcox et al. . |
| 4,754,780 | 7/1988 | Smith, III . |
| 4,768,551 | 9/1988 | Allread et al. . |
| 4,832,080 | 5/1989 | Smith, III . |
| 4,924,909 | 5/1990 | Wilcox . |
| 5,063,965 | 11/1991 | Wilcox . |
| 5,072,755 | 12/1991 | Wilcox . |
| 5,099,882 | 3/1992 | Smith, III . |
| 5,203,374 | 4/1993 | Smith, III . |
| 5,232,021 | 8/1993 | Smith . |
| 5,277,225 | 1/1994 | Smith . |
| 5,360,035 | 11/1994 | Smith . |
| 5,469,887 | * 11/1995 | Smith, III ................ 137/614.04 |

\* cited by examiner

*Primary Examiner*—Kevin Lee
(74) *Attorney, Agent, or Firm*—Fulbright & Jawor

(57) ABSTRACT

An undersea hydraulic coupling is pressure balanced to reduce forces tending to urge the coupling members apart during coupling or uncoupling. A seal retainer having an L-shaped fluid passage is used to provide fluid communication between the radial fluid passage in the male member and the longitudinal fluid passage in the female member of the coupling. The seal retainer holds one or more radial seals in the female member upon disengagement of the male coupling member.

16 Claims, 2 Drawing Sheets

PRESSURE BALANCED UNDERSEA HYDRAULIC COUPLING

BACKGROUND OF THE INVENTION

1. Field of the Invention

This invention relates, in general, to hydraulic couplings, and specifically to hydraulic couplings used in undersea drilling and production applications. More particularly, the invention involves a pressure balanced hydraulic coupling wherein radial passages are positioned to allow connection or disconnection of the coupling without substantial fluid pressure exerted axially against the face of the male member.

2. Description of Related Art

Subsea hydraulic couplings are old in the art. The couplings generally consist of a male member and a female member with sealed fluid passage ways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

Problems arise with the use of hydraulic couplings in relatively high pressure systems due to the high axial forces imposed on the male and female members during the coupling operation and during their use. In such couplings, it is necessary for the fluid force opposing the face of the male or female member to be overcome before fluid communication is established between the members. In a relatively high pressure system, high forces imposed on the valve members may render the connection of the coupling members difficult. Also, during use, fluid pressure is exerted between the male and female members in such a way as to tend to separate them. The force necessary to join the members and the resultant tendency of the coupling members to separate are characteristic problems in the prior art. High pressure systems and undersea applications also experience problems associated with sealing the junction between the male and female members.

Ideally, hydraulic couplings should, as far as possible, be pressure balanced, so that fluid pressure does not hinder connection or urge separation of the members. The coupling members often include valves that open automatically on coupling and close automatically on uncoupling. The couplings also should prevent implosion of seals due to a vacuum when the coupling members are separated. Additionally, to prevent loss of hydraulic fluid during coupling or uncoupling, seals should be used which can withstand high pressures as well as the corrosive effects of undersea or other adverse environments.

In U.S. Pat. Nos. 4,694,859 and 5,762,106 to Robert E. Smith III, assigned to National Coupling Company, Inc., undersea hydraulic couplings with radial metal seals are shown. The radial metal seal is retained on a shoulder in the female member. The seal is pressure energized to seal radially with the circumference of the male member and with the female member. In U.S. Pat. No. 4,754,780 to Robert E. Smith III, a pressure balanced hydraulic coupling is shown having radial passages communicating between the male and female members so that hydraulic fluid flow is in a substantially radial direction and is not exerted against the face of either member. In the pressure balanced hydraulic couplings of U.S. Pat. Nos. 4,832,080, 5,099,882, 5,203,374, and 5,277,225, undersea hydraulic couplings are shown with radial passages for fluid communication to pressure balance the couplings. More specifically, U.S. Pat. No. 4,832,080 to Robert E. Smith III discloses a pressure balanced hydraulic coupling with metal seals used to seal the annulus between the male and female members when they are coupled. The metal seals may be pressure energized in response to fluid pressure in the coupling to enhance the sealing affect. U.S. Pat. Nos. 4,900,071 and 5,052,439 to Robert E. Smith III disclose undersea hydraulic couplings with two piece retainers including a cylindrical retainer sleeve member slidably received within the female member bore, and a threaded retainer locking member threaded to the wall of the central bore. An elastomeric seal is restrained from radial movement by a dovetail interfit with a mating shoulder on the retainer sleeve and/or the retainer locking member. U.S. Pat. No. 5,099,882 to Robert E. Smith III discloses a pressure balance hydraulic coupling having radial passages in the male and female members, a first pair of radial seals positioned on each side of the radial passages for sealing between the receiving chamber and the seal retainer, and a second pair of radial seals positioned on each side of the radial passages for sealing between the seal retainer and the male member. The seals are preferably pressure energized metal seals.

Recently, hydraulic systems of which undersea hydraulic couplings are a part have been needed for use in deeper water where subsea pressures are higher. In deep water applications, remote operating vehicles (ROVs) are used, almost exclusively, to connect, disconnect and maneuver the undersea hydraulic coupling assemblies. Typically, twenty or more coupling members are fastened to a manifold plate that an ROV positions and connects with opposing coupling members. In deep water applications where ROVs are used, it is desirable to reduce the size and weight of undersea hydraulic coupling members. A reduction in coupling size and weight is desirable so that ROVs can better position, connect and disconnect coupling members and manifold plates on which the coupling members reside. Accordingly, a lighter, more compact undersea hydraulic coupling that is pressure balanced is needed for subsea use in deep water applications.

SUMMARY OF THE INVENTION

The present invention resides in an undersea hydraulic coupling of the foregoing type, including male and female members to provide fluid communication therebetween with radial fluid passages mutually positioned to allow connection or disconnection of the coupling members without substantial fluid pressure exerted axially against the face of the male member. The radial fluid passages are mutually positioned so as to substantially prevent separation forces between the male and female members when the passages are pressurized by fluid. A seal retainer, which is inserted into the receiving chamber of the female member and locked in place with a retainer locking member, includes a radial passage and a longitudinal passage for the flow of hydraulic fluid therethrough. The longitudinal fluid passage in the retainer is positioned to interconnect and provide fluid communication with a longitudinal flow passage in the female member body. The configuration of flow passages in the retainer allows reduction of the outer diameter of the female member body, thereby reducing the size and weight of the female coupling member.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
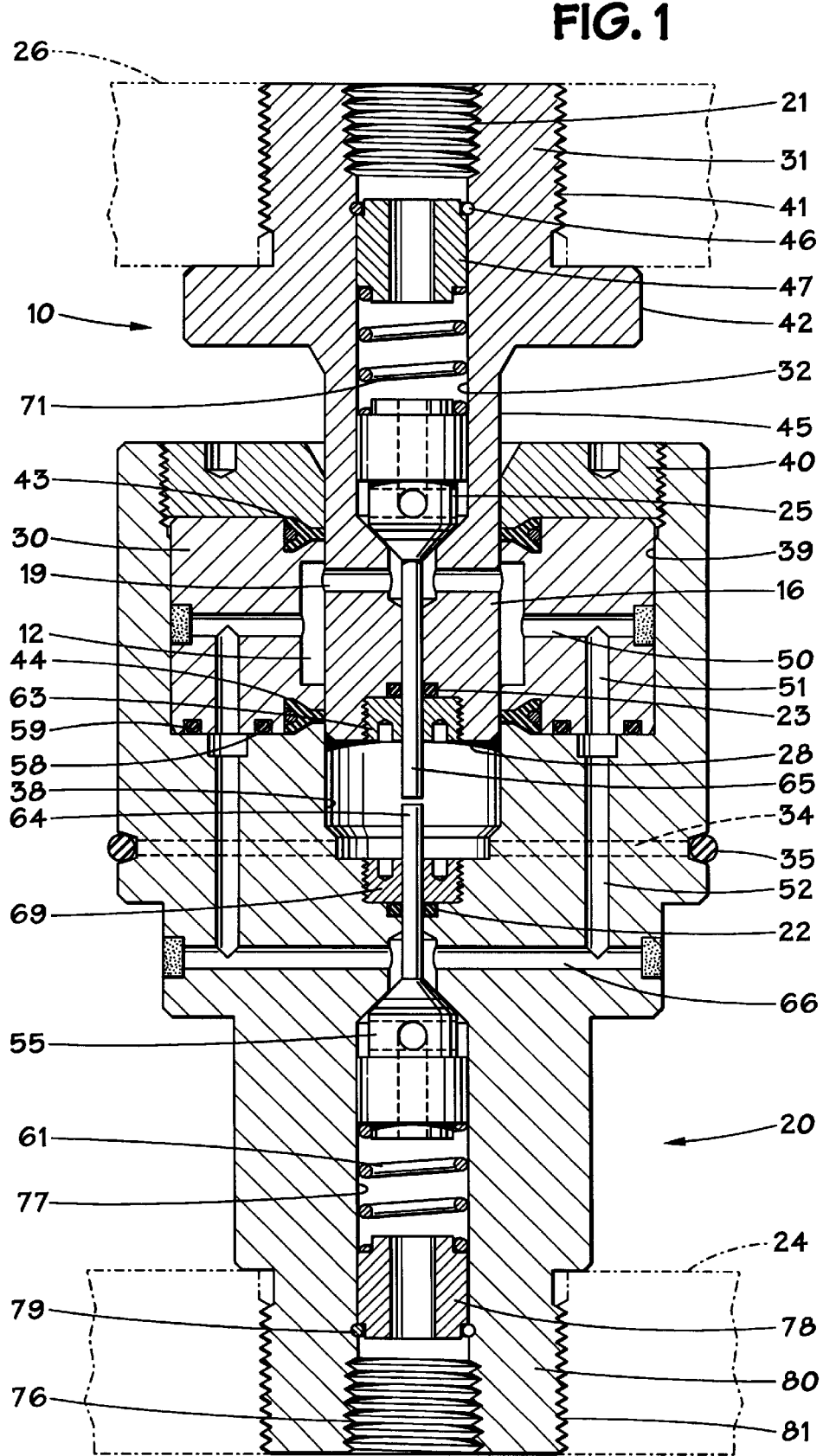
FIG. 1 is a sectional view of the male member and female member of the coupling according to a first embodiment, with the male member partially inserted into the female member.
Figure 2:
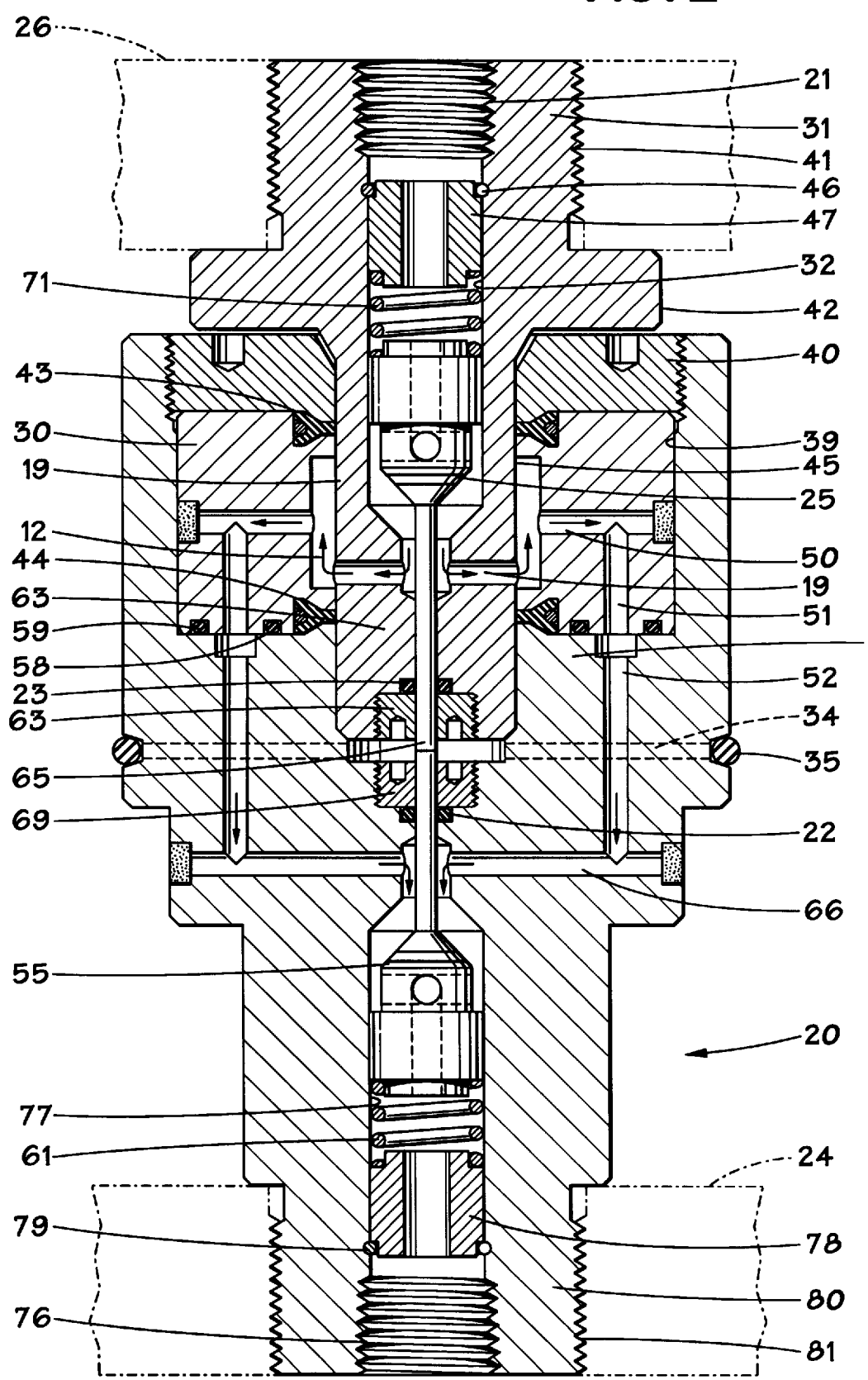
FIG. 2 is a sectional view of the male member fully inserted into the female member of the coupling according to a first embodiment.

In FIG. 1 and FIG. 2, a first embodiment of the undersea hydraulic coupling of the present invention is shown. The coupling comprises male member 10, female member 20, retainer 30, and retainer locking member 40. The retainer is inserted into receiving chamber 39 of the female member and is held in place by retainer locking member 40. When male member 10 is inserted through the retainer and into bore 38 of the female member, radial fluid passages permit fluid communication between the male and female members. The fluid communication is established without significant pressure exerted against the face of the male member during or after insertion. The fluid communication between the male and female members is established through a radial passage in the male member, an L-shaped passage in the retainer, and a longitudinal passage 52 and radial passage 66 in the female member body.

Male member 10 includes handle 31, flange 42, and probe 16. The handle of the male member may be threaded at 41 to a manifold plate. The male member and female member typically connect to opposing plates of a manifold and are held together by bolts or hydraulic members attached to the plates. The male member is commonly attached to one plate 26 while the female member is attached to an opposing plate 24 so as to face the male member and align with it. Handle 80 of the female member may be threaded at 81 to plate 24. Handle 80 also may be internally threaded at 76 to allow connection to hydraulic lines. Similarly, handle 31 of the male member may be threaded at 21 to provide connection to hydraulic lines. The male and female members may be attached to manifold plates using various means such as set screws or threads. Techniques for attaching the members to such manifold plates are well known to those skilled in the art.

The probe 16 of the male member has cylindrical bore 32 extending therethrough. A poppet valve 25 may be included in the central bore of the male member. Valve actuator 65 is used to urge the male member valve open after the valve actuator contacts the corresponding valve actuator 64 of the female member. Valve 25 is biased to the closed position by valve spring 71 in the male member bore. The valve spring is anchored with spring collar 47 which is held in place in the bore by clip 46. The probe includes a probe wall or outer circumference 45 that terminates at leading face 28. In a preferred embodiment, an elastomeric or metal ring shaped seal 23 engages the outer circumference of valve actuator 65. Seal 23 is held in place adjacent the leading face of the male member by nut 63 which is threaded to the probe section 16 adjacent the male member leading face.

When the valve of the male member is in the closed position, hydraulic fluid transmission is blocked through the male member of the coupling. Fluid may be transmitted through the male member by opening the valve so that radial passage 19 communicates between internal bore 32 of the male member and the outer circumference or probe wall 45 of the male member. Preferably, a pair of radial fluid passages 19 are positioned between the central bore 32 of the male member and the cylindrical probe wall 45.

Although the embodiment of FIGS. 1 and 2 shows the valve actuators extending from the apex of the poppet valves, alternatively the valve actuators may be detached from the poppet valve of each member. If the valve actuators are detached from the poppet valves, a flange on the actuator may be included to limit the travel of the actuator.

The female member of the coupling includes central bore 77 with a poppet valve 55 slidable therein between open and closed positions. When the poppet valve is closed, fluid communication is blocked between bore 77 and radial fluid passage way 66 in the female member body. Valve spring 61 urges poppet valve 55 into a closed position. The valve spring is held in place with spring collar 78 and clip 79. Valve actuator 64 extends from the apex of the conical face of poppet valve 55 of the female member. Alternatively, as described above, the valve actuator may be detached from the poppet valve of the female member. An elastomeric or metal ring shaped seal 22 engages the diameter of valve actuator 64 to prevent fluid leakage around the actuator. Seal 22 is held in place by externally threaded nut 69.

To seal the junction between the male member and female member, a ring shaped seal is positioned in the female member body and is held in place by seal retainer 30. In a preferred embodiment as shown in FIG. 1 and FIG. 2, seal 44 is an elastomeric seal having a dovetail interfit between the female member and the retainer 30. Alternatively, various other elastomeric seals or metal seals such as hollow pressure energized metal seals may be used to seal radially between the female member and the probe wall 45 of the male member. Additionally, ring shaped seal 43 is positioned between the retainer 30 and the retainer locking member 40. Seal 43, in a preferred embodiment, is an elastomeric dovetail seal having a dovetail interfit between the retainer and retainer locking member. However, seal 43 also may be another soft seal such as an O-ring or a metal seal such as a hollow pressure energized metal seal. As shown in FIG. 1 and FIG. 2, seals 44 and 43 are positioned longitudinally on each side of radial fluid passage way 50 in the retainer. Seals 44 and 43 prevent leakage of hydraulic fluid communicating between radial passage 19 in the male member and radial passage 50 in the seal retainer.

In a preferred embodiment, the inner circumference of the retainer includes annular space 12 which helps facilitate flow of hydraulic fluid when the male coupling member is slightly misaligned with the female member. Retainer 30 includes at least one L-shaped passage to facilitate fluid communication between the male and female coupling members. Each L-shaped passage includes a radial passage 50 for fluid communication with radial passage 19 in the male member, and a longitudinal passage 51 for fluid communication with longitudinal passage 52 in the female member. Radial passage 50 in the retainer is interconnected to longitudinal passage 51. When the retainer is fully inserted into the large bore 39 of the female member, the longitudinal passage in the retainer should align so as to permit fluid communication with longitudinal passage 52 in the female member body. A pair of O-ring seals 58, 59 seal the junction between longitudinal passages 51 and 52 in the retainer and female member respectively. Alternatively, seals 58 and 59 may be metal seals.

In a preferred embodiment, the male member is inserted through the retainer and into the receiving chamber 38 of the female member before the valve actuators 64 and 65 come into contact to open the poppet valves. The male member is sealingly engaged with radial seals 43 and 44 before the flow of hydraulic fluid between the coupling members commences. It is desirable, in undersea hydraulic couplings, to expel trapped sea water or other fluid from the cavity between the leading face 28 of the male member and the female member receiving chamber 38. One or more vent passages 34 are located in the female member body to allow egress of trapped sea water from the receiving chamber. Optionally, O-ring 35 may be positioned around the outer circumference of the female member body to permit trapped sea water to escape through vent passage 34 and prevent hydraulic lock without additional sea water entering the coupling through the vent passage.

Although in a preferred embodiment a pair of radial passages are shown in the male member, retainer, and female member, the present invention contemplates that one or more radial passages may be used in each of these components of the coupling assembly. Fluid transmission between the coupling members is facilitated by radial transmission of hydraulic fluid through the radial passages without exerting significant pressure against the leading face 28 of the male member or against the receiving chamber in the female member. Also, it is contemplated that the present invention may be used in a coupling with or without valves in the male or female coupling members.

The present invention provides a pressure balanced undersea hydraulic coupling with a plurality of radial seals between the male and female coupling members, and which has a reduced weight and outer diameter. The reduced size and weight are due to the design of the retainer 30 having one or more L-shaped fluid passages therethrough, including one or more longitudinal and one or more radial passages to facilitate hydraulic fluid flow through the retainer. The fluid passage in the retainer provides fluid communication between each radial fluid passage 19 in the male coupling member and longitudinal fluid passage 52 in the female coupling member. The L-shaped fluid passage in the retainer rather than in the female member body allows the external diameter of the female coupling member to be reduced.

Although variations in the embodiment of the present invention may not each realize all of the advantages of the invention, certain features may become more important than other others in various applications of the device. The invention, accordingly, should be understood to be limited only by the scope of the appended claims.

What is claimed is:

1. An undersea hydraulic coupling comprising:
   (a) a male coupling member having a cylindrical probe wall, a central bore, and a radial fluid passage extending between the central bore and probe wall;
   (b) a female coupling member having a first end and a second end, a receiving chamber adjacent the first end and a central bore adjacent the second end, an internal shoulder between the receiving chamber and central bore, a radial seal positioned on the internal shoulder, and a fluid passage extending between the central bore and receiving chamber; and
   (c) a seal retainer insertable into the receiving chamber for retaining the seal on the internal shoulder, the seal retainer having an L-shaped fluid passage having a first end communicating with the radial fluid passage in the male coupling member and a second end communicating with the fluid passage in the female member.

2. The undersea hydraulic coupling of claim 1 wherein the fluid passage in the female member includes a longitudinal passage and a radial passage.

3. The undersea hydraulic coupling of claim 1 further comprising a valve in at least one of the coupling members, the valve having an actuator for urging the valve open.

4. The undersea hydraulic coupling of claim 1 further comprising a retainer locking member engaged to the female member.

5. The undersea hydraulic coupling of claim 4 further comprising a second radial seal positioned between the seal retainer and retainer locking member.

6. The undersea hydraulic coupling of claim 1 wherein the seal is an elastomeric seal having a dovetail interfit between the internal shoulder and the seal retainer.

7. An undersea hydraulic coupling comprising:
   (a) a female member having a stepped central bore, the bore having at least two internal shoulder surfaces, and a longitudinal fluid passage positioned radially outwardly from the central bore;
   (b) a ring-shaped seal positionable on one of the internal shoulder surfaces;
   (c) a sleeve-shaped seal retainer insertable into the stepped internal bore, the retainer having a central bore, the retainer holding the ring-shaped seal on one of the internal shoulder surfaces, the retainer having a radial fluid passage and a longitudinal fluid passage, the longitudinal fluid passage spaced radially outwardly from the central bore to correspond with and communicate with the longitudinal fluid passage in the female member; and
   (d) a male member having a radial fluid passage, the radial fluid passage communicating with the radial fluid passage in the retainer when the male member is fully inserted through the retainer into the central bore of the female member.

8. The undersea hydraulic coupling of claim 7 further comprising a poppet valve in the male member and a poppet valve in the female member, the poppet valve having mutually engageable valve actuators.

9. The undersea hydraulic coupling of claim 7 wherein the ring-shaped seal is an elastomeric seal having a dovetail interfit between one of the internal shoulder surfaces and the retainer.

10. The undersea hydraulic coupling of claim 7 wherein the ring-shaped seal is a pressure-energized metal seal.

11. The undersea hydraulic coupling of claim 8 further comprising a first ring-shaped seal between the valve actuator and the male member, and second ring-shaped seal between the valve actuator and the female member.

12. The undersea hydraulic coupling of claim 7 further comprising a pair of ring-shaped seals engaging the internal shoulder surface of the female member and sealing with the retainer, the first ring-shaped seal positioned radially inwardly from the longitudinal fluid passage and the second ring-shaped seal positioned radially outwardly from the longitudinal fluid passage.

13. A female member of an undersea hydraulic coupling member comprising:
   (a) a body having a first end and a second end, a central bore adjacent the first end with a poppet valve positioned in the central bore and slidable from an open to a closed position, a radial passage extending radially outwardly from the central bore, the poppet valve controlling fluid flow between the central bore and the radial passage, a longitudinal passage connected to the radial passage, the longitudinal passage positioned radially outwardly from the central bore; and (b) a seal retainer engageable with the female member, the seal retainer having a central bore and a longitudinal fluid passage positioned radially outwardly from the central bore, and a radial fluid passage connected between the longitudinal fluid passage and the central bore of the seal retainer.

14. The female coupling member of claim 13 further comprising a ring-shaped seal having a dovetail interfit between the female member and the seal retainer.

15. The female coupling member of claim 13 further comprising a second ring-shaped seal having a dovetail interfit with the seal retainer.

16. The female coupling member of claim 13 further comprising a valve actuator contacting the poppet valve.

* * * * *